(12) United States Patent
Hendriks

(10) Patent No.: US 9,952,087 B2
(45) Date of Patent: Apr. 24, 2018

(54) CONVEYOR SYSTEM COMPRISING A PLURALITY OF SUPPORT MEMBERS AND A METHOD THEREOF

(71) Applicant: OPTIMUS SORTER HOLDING B.V., Wijchen (NL)

(72) Inventor: Albert Hendriks, Wijchen (NL)

(73) Assignee: OPTIMUS SORTER HOLDING B.V., Wijchen (NL)

( * ) Notice: Subject to any disclaimer, the term of this patent is extended or adjusted under 35 U.S.C. 154(b) by 0 days.

(21) Appl. No.: 15/552,224

(22) PCT Filed: Apr. 18, 2016

(86) PCT No.: PCT/NL2016/050270
§ 371 (c)(1),
(2) Date: Aug. 18, 2017

(87) PCT Pub. No.: WO2016/133398
PCT Pub. Date: Aug. 25, 2016

(65) Prior Publication Data
US 2018/0038728 A1    Feb. 8, 2018

(30) Foreign Application Priority Data

Feb. 20, 2015 (NL) ..................................... 2014325

(51) Int. Cl.
*G01G 11/02*  (2006.01)
*B07C 5/18*  (2006.01)
(Continued)

(52) U.S. Cl.
CPC ............. *G01G 19/035* (2013.01); *B07C 5/18* (2013.01); *G01G 11/003* (2013.01); *G01G 11/02* (2013.01)

(58) Field of Classification Search
CPC .... G01G 11/02; G01G 11/025; G01G 19/035; G01G 11/003; B07C 5/18
(Continued)

(56) References Cited

U.S. PATENT DOCUMENTS 4,426,006 A * 1/1984 Horii ........................ B07C 5/18
  177/145
4,660,665 A * 4/1987 Powell, Jr. ........... G01G 11/003
  177/1
(Continued)

FOREIGN PATENT DOCUMENTS

| EP | 0540126 | 5/1993 |
| EP | 0568763 | 11/1993 |

OTHER PUBLICATIONS

International Search Report for PCT/NL2016/050270, Completed by the European Patent Office dated Jul. 18, 2016, 3 Pages.

*Primary Examiner* — Mark A Deuble
(74) *Attorney, Agent, or Firm* — Brooks Kushman P.C.

(57) ABSTRACT

A conveyor system for transporting items from a receiving section to an outlet section, the conveyor system having plurality of first support members for transporting items and a weighing device. wherein a second support member is arranged at a first support member by way of a support assembly, allowing the second support member for being supported by the first support member in a first vertical position and for being moved relative to the first support member between the first vertical position and a second vertical position higher than the first vertical position. The conveyor system includes a lifting device for moving the second support member from the first vertical position towards the second vertical position. The weighing device is arranged for supporting the second support member when the second support member is in the second vertical position.

13 Claims, 4 Drawing Sheets

(51) Int. Cl.
*G01G 19/03* (2006.01)
*G01G 11/00* (2006.01)

(58) Field of Classification Search
USPC .......................................................... 198/959
See application file for complete search history.

(56) References Cited

U.S. PATENT DOCUMENTS

| | | | | |
|---|---|---|---|---|
| 5,579,922 A | * | 12/1996 | Arlt | G01G 11/00 |
| | | | | 209/592 |
| 6,262,377 B1 | * | 7/2001 | Nielsen | B65B 1/32 |
| | | | | 177/1 |
| 7,222,715 B2 | * | 5/2007 | Madden | B07C 5/36 |
| | | | | 177/145 |
| 8,746,435 B2 | * | 6/2014 | Nijland | B07C 5/18 |
| | | | | 198/370.04 |

\* cited by examiner

CONVEYOR SYSTEM COMPRISING A PLURALITY OF SUPPORT MEMBERS AND A METHOD THEREOF

CROSS-REFERENCE TO RELATED APPLICATION

This application is the U.S. national phase of PCT Application No. PCT/NL2016/050270 filed on Apr. 18, 2016, which claims priority to NL Patent Application No. 2014325 filed on Feb. 20, 2015, the disclosures of which are incorporated in their entirety by reference herein.

FIELD OF THE INVENTION

The invention is in the field of conveyor systems comprising a plurality of support members for transporting items, wherein the support members are connected to a driving system and guided via a guiding system. In particular, the support members of the invention are tray members.

BACKGROUND OF THE INVENTION

Conveyor systems for transporting items are known in the art. The conveyor systems are arranged to move support members capable of transporting items. The support members are connected to the driving system to be moved from a receiving section to an outlet section. When in movement, the support members are guided via the guiding system to follow for example an endless path in order to achieve a continuous operation of the conveyor system.

From the logistic point of view, the weight of the items being transported is desired, or even required, to be known to process said items. In the art, the weight is measured before said items are delivered to the support members, for example via a delivery conveyor. Measurement of the weight of the items is a discontinuous operation and, therefore restricts the capacity and/or output of the conveyor system.

It is an object of the invention to alleviate the above mentioned problem.

SUMMARY OF THE INVENTION

A first aspect of the invention relates to a conveyor system for transporting items from a receiving section to an outlet section, the conveyor system comprising
  a plurality of first support members for transporting the items;
  a driving system along which the plurality of first support members are coupled subsequently for transporting said plurality of first support members from the receiving section to the outlet section;
  a guiding system for guiding at least the plurality of first support members; and
  a weighing device for weighing the items at a weighing area;
wherein a second support member is arranged at a first support member by a means to form a support assembly, the means allowing the second support member for:
  i) being supported by the first support member in a first vertical position; and
  ii) being moved relative to the first support member between the first vertical position and a second vertical position higher than the first vertical position;
wherein the conveyor system comprises upstream relative to the weighing area a lifting device for moving the second support member from the first vertical position towards the second vertical position and wherein the weighing device is arranged for supporting the second support member at the weighing area when said second support member is in the second vertical position.

A second aspect of the invention relates to a method for processing items using a conveyor system, the method comprising the steps of
  transporting the items from a receiving section to an outlet section of the conveyor system;
  weighing the items; and
  processing the items according to the weight;
wherein the conveyor system is a conveyor system according to the first aspect of the invention, and wherein weighing the items comprises the steps of
  moving the second support member of the support assembly relative to the first support member of said support assembly from the first vertical position to the second vertical position higher than the first vertical position by the lifting device; and
  weighing the second support member when said second support member is being supported on the weighing device in the second vertical position.

DETAILED DESCRIPTION OF THE INVENTION

The first aspect of the invention concerns a conveyor system according to claim 1. In this way, the conveyor system provides a continuous transportation of the items thereby improving the capacity and/or output of the conveyor system since said items can be weighed during transport.

In the conveyor system according to the invention there is a plurality of first support members coupled to the driving system for transporting the items and a second support member is arranged at least at one of the first support members of the plurality. The first support member and the second support member form a support assembly. It is preferred that the conveyor system comprises a plurality of support assemblies, wherein each of the first support members of the plurality comprises a second support member.

In the support assembly, the second support member is arranged at the first support member in such a way that the second support member is supported by said first support member in a first vertical position relative to said first support member. Thus, the second support member is capable of being transported with the first support member. Besides, the second support member is also arranged at the first support member in such a way that said second support member is capable of being moved relative to said first support member between the first vertical position and a second vertical position higher than said first vertical position. Thus, the second support member, and the item supported by said second support member, can be moved upward relative to the first support member.

The conveyor system comprises a means capable of supporting the second support member by the first support member, and moving the second support member relative to the first support member between the first and the second vertical position. For example, the means may comprise an organ comprising two hinges connected by a plate, one of the hinges being arranged at the first support member and the other hinge being arranged at the second support member. Thus, the second support member may be supported on top of the first support member or being hanged in the first vertical position. In another embodiment, the means may comprise a pin or protrusion protruding from one of the first support member or the second support member and an opening for hosting the pin in the other support member of the support assembly. In this embodiment, the second support member may be supported on top of the first support member or being hanged in the first vertical position by a stopper present in the pin.

The term support member means that said support member is capable of carrying at least the item during transport. The first support member is capable of carrying both the item and the second support member, and the second support member is capable of carrying the item.

When the second support member is hanging from the first support member, said second support member may be a plate comprising a hook for holding the item. In a different embodiment, when the second support member is supported above the first support member, said second support member may be a tray member, for example a tray or bowl comprising a support area for holding the item during transport. The tray member may further comprise walls to reduce the risk of dropping the item out of the support area.

The first support member may have any shape capable of allowing the two effects provided by the means while reducing the risk of bumping an item being transported by the second support member into the first support member. For example, the first support member may be a frame comprising an opening wherein the second support member tray is capable of moving through. If the second support member is above the first support member in the first position, the first support member may also be a tray. The first support member may further comprise walls to guide the movement of the second support member and to reduce the risk of dropping the item out of the support area of the second support member.

The conveyor system according to the invention comprises a weighing device arranged in a weighing area for receiving the second support member when said second support member is in the second vertical position relative to the first support member. Thus, the second support member and the item transported by said second support member are supported on the weighing device, and the weight of said item can be determined.

As the support assembly is being transported by the guiding system and the guiding system of the conveyor, the second support member is moved from the first vertical position towards the second vertical position by a lifting device to be received by the weighing device at said second vertical position.

In an embodiment, the lifting device may be an actuator arranged at the support assembly. In another embodiment electromagnets may be provided to produce repulsive forces capable of moving the second support member relative to the first support member. The actuator or electromagnet may be in communication with a photoelectric cell present upstream relative to the weighing area in order to move the second support member upward before arriving at the weighing area. In another embodiment, the lifting device may also be the driving system and the guiding system of the conveyor system and the weighing area since they may be arranged such that the support assembly is moved downward relative to the weighing area until the second support member is supported on the weighing area in the second vertical position.

In an embodiment, the means of the support assembly comprises a protrusion and an opening for hosting the protrusion. In this way, the two effects are achieved with an easy design of the support assembly.

In an embodiment, the protrusion is arranged at the second support member and the opening is arranged at the first support member such that said second support member. It is preferred that the second support member is supported on top of the first support member in the first vertical position. In this way a more compact support assembly is obtained and the risk of interference between the item transported by the second support member and the first support member when the second support member moves relative to said first support member is reduced. It is preferred that the second support member is a tray member since the support assembly may easily transports items such as packages, parcels, etc.

In an embodiment, the protrusion extends from a top section downwardly in an inverted frustroconical shape, and the opening of the first support member comprises a circular section capable of adapting to the top section of the protrusion. In this way, the movement of the second support member relative to the first support member is improved. Since the opening adapts to the top section of the protrusion, the second support member is secured when being in the first position. Further, due to the inverted frustroconical shape of the protrusion, the movement relative to the first support member is facilitated, and the risk of blockage is reduced when the second support member is being moved to the second vertical position.

In an embodiment, the lifting device comprises a frame, the frame comprising a receiving area adjacent to the weighing area, said receiving area configured, when the support assembly is being moved by the driving system, for
  i) receiving the support organ of the second support member when said second support member is in the first vertical position and;
  ii) guiding said support organ upward to the weighing area of the weighing device wherein the second support member is in the second vertical position.

In this way, the second support member may be moved from the first vertical position to the second vertical position without using additional electronic components or driving and guiding means, allowing for a cheaper conveyor system. Further, the frame and the weighing device may be placed at different positions along the transport direction of the support assembly, providing a flexible conveyor system.

The receiving area is an area of the lifting device capable of receiving the support organ of the second support member and guiding said support organ in a positive slope to the weighing area of the weighing device as the support assembly moves in the transport direction. Thus, the second support member may be tilted slightly and gradually lifted relative to the first support member in a smooth way, reducing the risk of dropping the item supported during the process. Further, the design of the receiving area depends on the design of the support assembly, the support organ, the weighing area of the weighing device, and the transport direction of said support assembly.

If the second support member is a tray member, the support organ is designed to help to reduce the risk of dropping the item out the support area when said second support member is being moved to the second vertical position by the receiving area. Further, the support organ is also designed to reduce the risk of dropping the item when the second support member is being supported on the weighing area. For instance, the support organ may comprise three pins or protrusions, preferably four protrusions, to keep the support area of said tray member stable in a horizontal position.

In an embodiment, the second support member comprises the protrusion as means for movement relative to the first support member. It is preferred that the protrusion is the support organ. In this way, coast are reduced and a simple design of the support assembly may be achieved.

In an embodiment, the conveyor system further comprises a setting-down device arranged downstream with respect to the weighing area, the setting-down device configured for moving the second support member relative to the first support member from the second vertical position to the first vertical position. In this way, although the second support member may return back to the first position after passing the weighing area due to gravity, the movement of the second support member may be achieved in a smooth way, reducing the risk of dropping the item during the process.

In an embodiment, the setting-down device comprises a frame comprising a setting-down area adjacent to the weighing area, the setting-down area configured, when the second support member is being moved by the driving system, for
  i) receiving the support organ of the second support member from the weighing area; and
  ii) guiding said support organ downward to get the second support member back in the first vertical position.

In general, the setting-down area is an area of the setting-down device capable of receiving the support organ of the second support member when said second support member is in the second vertical position and guiding said support organ in a negative slope from the weighing area as the support assembly moves in the transport direction. Consequently, the design of the setting-down area depends on the design of the support assembly, the support organ, the weighing area, and the transport direction of said support assembly.

In an embodiment, the weighing area is arranged at a conveyor belt, the conveyor belt being configured to move the second support member in the same direction and with the same speed as the support assembly. In this way, the effect that the first support member may have in the weight of the second support member and the item is negligible. Further, the extremes of the conveyor belt can be used as receiving area and setting-down area, and there is no need of a lifting or setting-down device.

The second aspect of the invention concerns a method for processing items according to claim 12. In this way, the items are transported by support assemblies and weighed in a continuous operation.

In the method according to the invention, an item is supported by a second support member and transported from a receiving section to an outlet section of the conveyor system while being supported by the first support member. The second support member is then moved from the first vertical position to the second vertical position by the lifting device and then, said second support member is received at a weighing area of a weighing device in said second vertical position. Since the weight of the second support member is known, the weight of the item being supported can be determined.

In an embodiment, the method comprises the step of moving the second support member relative to the first support member from the second vertical position to the first vertical position downstream the weighing area. In this way the second support member is moved back to the first vertical position after the weighing step when the support assembly is being moved by the driving system.

BRIEF DESCRIPTION OF THE DRAWINGS

For the purpose of illustrating the invention, the drawings show aspects of one or more embodiments of said invention. However, it should be understood that the present invention is not limited to the precise arrangements and instrumentalities shown in the drawings, wherein.

DETAILED DESCRIPTION OF THE DRAWINGS

It should be noted that items which have the same reference numbers in different figures, have the same structural features and the same functions. Where the function and/or structure of such item has been explained, there is no necessity for repeated explanation thereof in the detailed description.

It should be noted that the above-mentioned embodiments illustrate rather than limit the invention, and that those skilled in the art will be able to design many alternative embodiments.

Figure 1A:
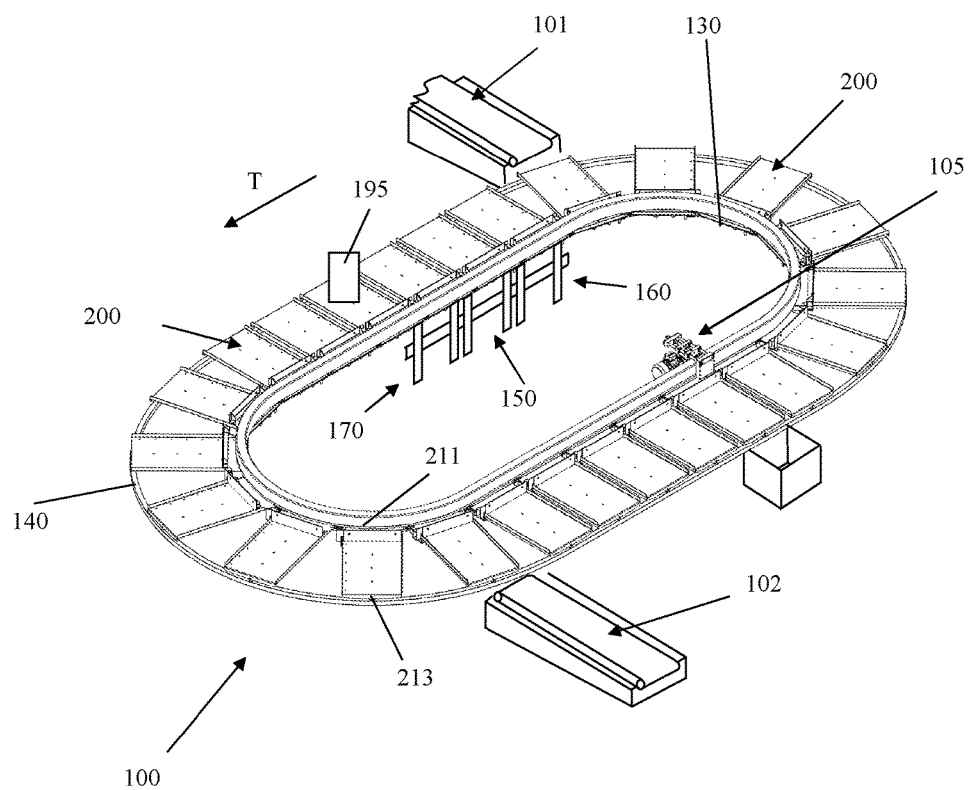
FIG. 1A shows a view of a conveyor system according to the invention.

FIG. 1 shows a conveyor system 100 according to the invention. In the example depicted in FIG. 1A, the conveyor system 100 comprises a plurality of support assemblies 200 connected to a driving system 130 by the connecting means 211. In the present example the driving system 130 is formed by an array of concatenated driving roads mutually hingedly connected in such a way that each driving rod connected with a support assembly 200 is configured to follow a path defined by the orientation of a guiding system 140. The driving system 130 forming a chain, especially an endless chain, is driven by an actuator 105. Each of the support assemblies 200 comprises a wheel 213 to be guided by the guiding system 140, in the present example a first rail 140 that receives said wheels 213.

In the present example, the driving system 130 and the guiding system 140 allow for movement of the support assemblies 200 in the horizontal along a transport direction T shown by an arrow in FIG. 1 from a receiving section 101 to an outlet section 102 of the conveyor system 100. Items 195 are transported on top of the support assemblies 200.

Figure 1B:
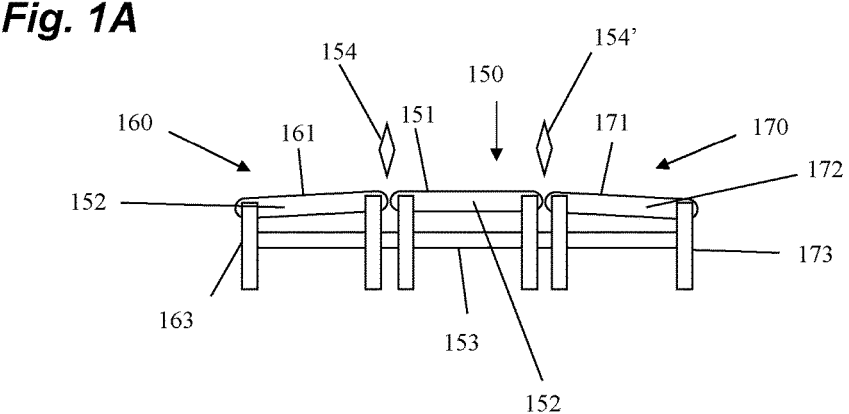
FIG. 1B shows a lifting device, a weighing device and a setting-down device of the conveyor system depicted in FIG. 1A.

FIG. 1A shows that the conveyor system 100 also comprises a weighing device 150 arranged under the path of support assemblies 200, a location of which is suitable for collecting data relating to the weight of an item 195 being transported by the conveyor system 100. As depicted in FIG. 1B, the weighing device 150 forms a weighing area 151 being arranged for weighing an item 195 placed on top of the support assemblies 200. In the weighing area 151, a first conveyor belt 152 is disposed horizontally being supported by a frame 153. At both sides of the weighing area 151 two photoelectric cells 154 and 154' may be arranged to cooperate with the weighing device 150, as will be explained below. In the present example, the weighing device 150 is also in communication with a processing unit 180 connected to an actuator 185. The functions of them will be explained later. Besides the weighing device 150 there is a conveyor belt 181. The function will be explained later.

Upstream the weighing device 150 in the transport direction T, the conveyor system 100 comprises a lifting device 160 (see FIG. 1A). As depicted in FIG. 1B, the lifting device 160 comprises a receiving area 161. In this example, the receiving area 161 is formed by a second conveyor belt 162 supported by a frame 163 such that in the transport direction T the receiving area 161 defines a positive slope towards the weighing area 151, said receiving area 161 being adjacent to the weighing area 151 of the weighing device 150.

Downstream the weighing device 150 in the transport direction T, the conveyor system 100 comprises a setting-down device 170 (See FIG. 1A). The setting-down device 170 comprises a setting-down area 171 (see FIG. 1B). In this example, the setting-down area 171 is a third conveyor belt 172 supported a frame 173. In this example, the setting-down device 170 is arranged such that in the transport direction T the setting-down area 171 defines a negative slope starting beside the weighing area 151.

Figure 2A:
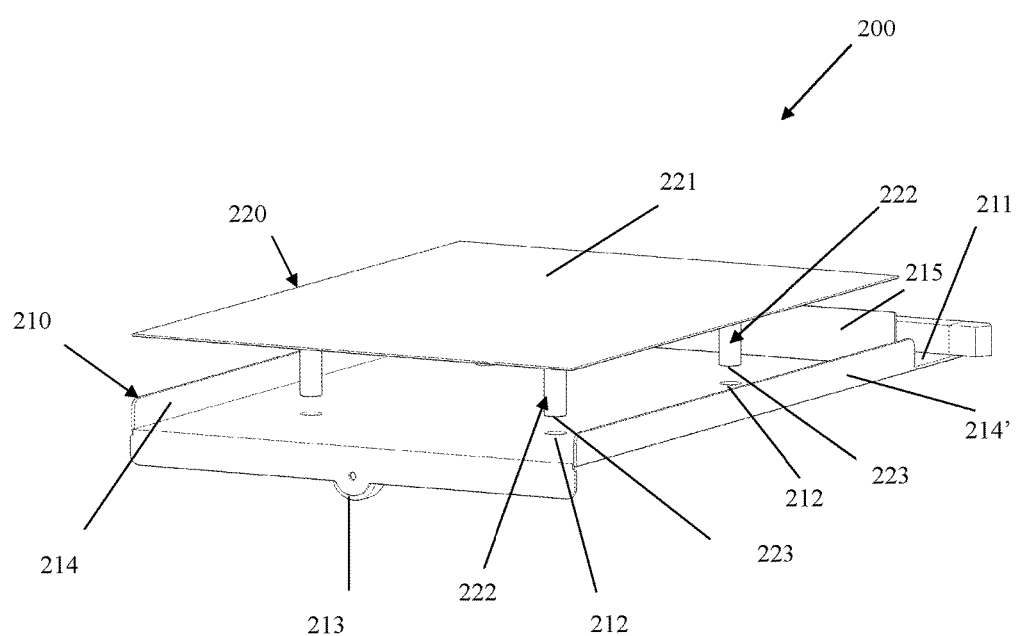
FIG. 2A shows an exploded view of a support assembly of the conveyor system depicted in FIG. 1A, the support assembly comprising a first support member and a second support member.

FIG. 2A depicts an exploded view of a support assembly 200. In the present example, the support assembly 200 comprises a first support member 210 and a second support member 220.

The first support member 210 in this example is a first tray 210 comprising the connecting means 211, four openings 212, the wheel 213, two walls 214 and 214' and a pushing organ 215. The second support member 220 is a second tray 220 having a support area 221 and four protrusions 222 protruding downwardly from the support area 221 towards a foot portion 223.

Figure 2B:
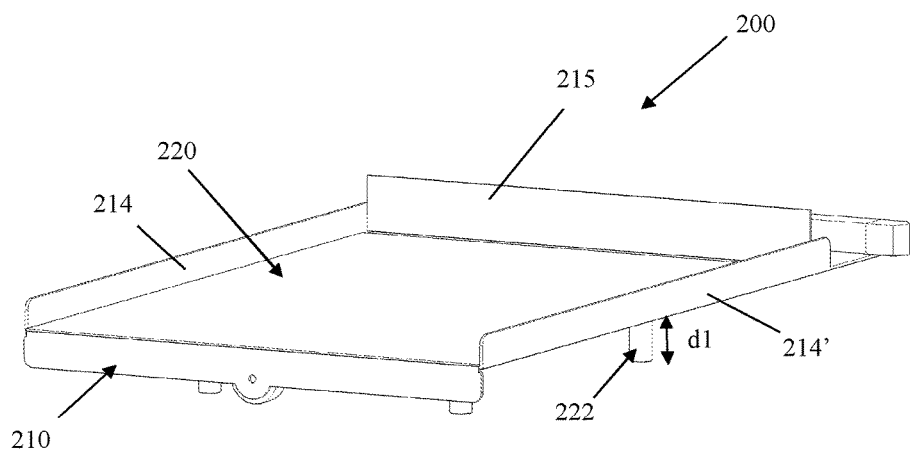
FIG. 2B shows the support assembly depicted in FIG. 2A when the second support member is in a first vertical position.
Figure 2C:
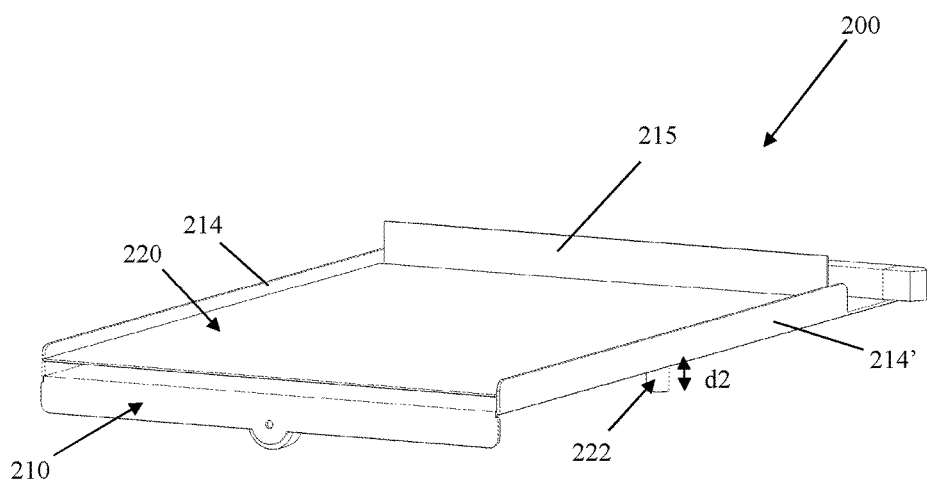
FIG. 2C shows the support assembly depicted in FIG. 2A when the second support member is in a second vertical position.

The dimensions and distribution of the protrusions 222 and the openings 212 are arranged such that said protrusions 222 can cooperate with said openings 212. The cooperation allows for arrangement of the second tray 220 above the first tray 210 when the protrusions 222 are hosted within their corresponding openings 212 to form the support assembly 200, as shown in FIGS. 2B and 2C. Further, the cooperation also allows for vertical movement of the second tray 220 relative to the first tray 210 within the walls 214 and 214' and the pushing organ 215. The walls 214 and 214' and the pushing organ 215 help to reduce the risk of dropping the items 195 off said support area 221. Besides, the support assembly 200 comprises an exit zone shown by an arrow 105.

In this example, the protrusions 222 protrude downward from the second tray 220 in an inverted frustroconical shape and the openings 212 have a cylindrical shape whose diameter is arranged to adjust to the top section of the protrusions 222. Thus, the cooperation allows for free movement of the protrusions 222 all along their length within the openings 212. The second tray 220 is capable of being in a first vertical position (see FIG. 2B), wherein said second tray 220 is supported on top of the first tray 210 and the four protrusions 222 protrude in a first distance d1 through the four openings 212 of said first tray 210. Further, the second tray 220 is capable of being in a second vertical position (see FIG. 2C), wherein said second tray 220 is at a higher position relative to the first tray 210 than in the first vertical position and, consequently, the four protrusions 222 protrudes in a second distance d2 through the openings 212 of the first tray 210, the second distance d2 being smaller than the first distance d1.

FIG. 3 depicts a method wherein the conveyor system 100 depicted in FIG. 1 is in use to process the items 195. In order to make it clear, said FIG. 3 depicts in detail the cooperation of one support assembly 200 of the plurality of support assemblies 200 of the conveyor system 100 with the lifting device 160, the weighing device 150 and the setting-down device 170.

Figure 3A:
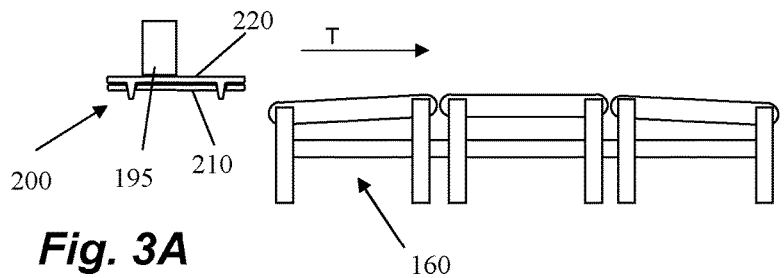
FIG. 3A shows a first stage of a method according to the invention wherein the conveyor system of FIG. 1 is in use.

In a first stage depicted in FIG. 3A, the support assembly 200 moves from the receiving section 101 towards the lifting device 160. In this first stage, the second tray 220 is being supported by the first tray 210 in the first vertical position due to gravity. In said first vertical position the protrusions 222 protrudes in a first distance d1 downward from the openings 212 of the first tray 210. Since the protrusions 222 protrude from the second tray 220 in an inverted frustoconical shape and the openings 212 are adjusted to the top section of the protrusions 222, the second tray 220 is supported in the first vertical position in a relative secured way since the oscillation due to a clearance that said second tray 220 may have with respect to the first tray 210 is minimal.

Figure 3B:
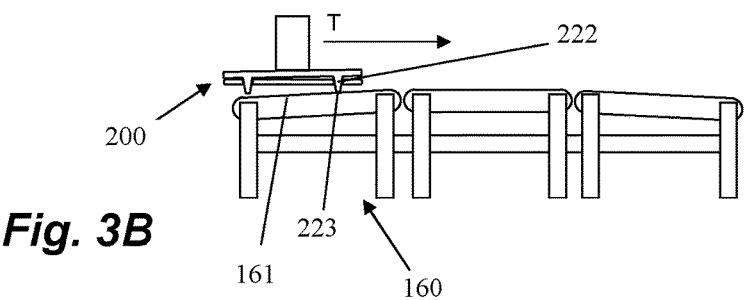
FIG. 3B shows a second stage of the method.

In a second stage depicted in FIG. 3B, the support assembly 200 arrives to the lifting device 160. In this stage the receiving area 161 receives the foot portions 223 of the protrusions 222 since said protrusions are protruding in a first distance d1 from the openings 212 of the first tray 210. When the support assembly 200 moves in the transport direction T, the receiving area 161 guides the protrusions 222 upward until said protrusions 222 protrude in a second distance d2 from the openings 212 of the first tray 210, which is achieved when the support assembly 200 arrives at the end of the receiving area 161. Therefore, the positive slope of the receiving area 161 is arranged such that the second tray 220 is moved from the first vertical position to the second vertical position.

Since the protrusions 222 extend in an inverted frustroconical shape, the second tray 120 may be lifted and lowered relative to the first tray 110 while the second tray 120 is guided by the protrusions 222 within the openings 212.

Figure 3C:
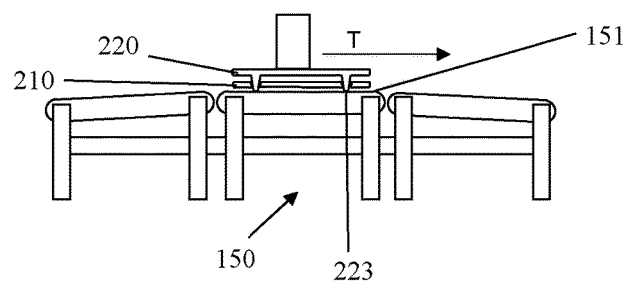
FIG. 3C shows a third stage of the method.

In a third stage depicted in FIG. 3C, the support assembly 200 arrives at the weighing device 150. The weighing area 151 is arranged such that as the support assembly 200 moves in the transport direction T, the foot portions 223 of the four protrusions 222 of the second tray 220 is supported on said weighing area 151 in the second vertical position at the same time. Thus, the four foot portions 223 forms a support organ 223 that keeps the support area in a horizontal position when supported on the weighing area 151 of the weighing device 150. The weight is measured when the second tray 220 is resting by its four foot portions 223 on said weighing area 151. Since the weight of the second tray 220 is known, the weight of the item 195 supported on the support area 221 can be determined. The controller 180 of the weighing device 150 may determine the moment at which the weight is measured using data from the photoelectric cells 154 and 154' about the presence of the support assembly 200 and the item 195 to be weighed.

At the second vertical position, the diameter of the section of the protrusions 222 received by the openings 212 is the smallest relative to the diameter of said openings 212. Since the weighing area 151 is provided with the first conveyor belt 152 and said first conveyor belt 152 is arranged for moving in the same direction and with the same speed in the transport direction T as the support assemblies 100, the effect that the first tray 210 may have on the weight measured by the weighing device 150 is negligible.

In the present example, the processing unit 180 processes the weight detected by the weighing device 150 and compares it with a predetermined weight. Then, depending on the weight of the item 195 measured, said item 195 may be processed at that very moment or is left on top of the second tray 220 to be transported by the support assembly 200. If the item 195 is to be processed, the processing unit 180 activates the actuator 185 that moves the pushing organ 215 towards the exit zone 105, transferring the item 195 to the adjacent conveyor belt 181 (not shown). Thus, the arrangement of the pushing organ 215 is such that it can be moved when the second tray 220 is in the first or second vertical position.

Figure 3D:
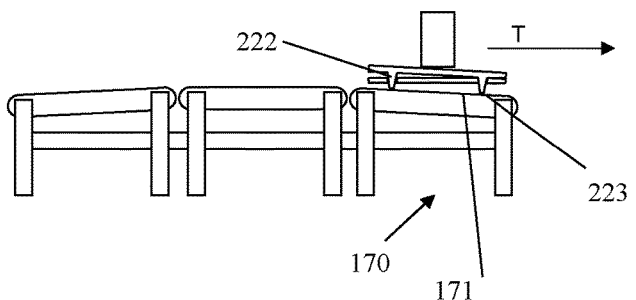
FIG. 3D shows a fourth stage of the method.
Figure 3E:
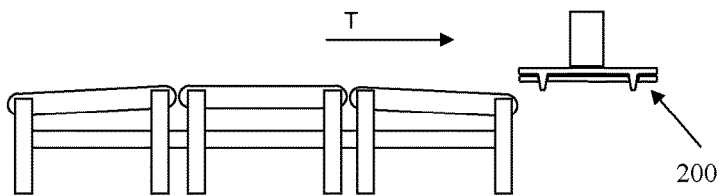
FIG. 3E shows a fifth stage of the method.

In a fourth stage depicted in FIG. 3D, the support assembly 200 arrives at the setting-down device 170. At this fourth stage, the setting-down area 171 receives the protrusions 222 protruding in a second distance d2 from the weighing area 151. As the support assembly 200 moves in the transport direction T, the setting-down area 171 guides the foot portions 223 of the protrusions 222 downward when the second tray 220 is moving downward relative to the first tray 210 due to gravity until said protrusions 222 protrudes in a first distance d1 from the openings 212 of said first tray 210. Therefore, the negative slope of the receiving area 161 is arranged such that the second tray 220 is moved from the second vertical position to the first vertical position. In a fifth stage depicted in FIG. 3E, the support assembly 200 keeps on moving in the transport direction T from the setting-down device 170 until the support assembly 200 reaches the outlet section 102 of the conveyor system 100, the second tray 220 being in the first vertical position.

The present invention may be varied within the scope of the appending claims. For example, the guiding system may be designed such that it allows for an descendant movement of the support assemblies such that the protrusions of the second tray are guided from the first vertical position to the second vertical position by the cooperation between said guiding system with the receiving area of the weighing device. Similarly, the guiding system may be designed such that it allows for an ascendant movement of the support assemblies such that the protrusions of the second tray are guided from the second vertical position to the first vertical position by the cooperation between said guiding system with the receiving area of the weighing device.

In a different example, the weighing device, the lifting device and the setting-down device may configure a single unit defined by a single frame. The height of the frame may be arranged by height adjustors, and the positive slope and the negative slope defined respectively by the receiving area and the setting-down area may also be adjusted by adjustors. This allows for a flexible weighing method, since the single system may be moved at different sections of the conveyor along the transport direction T. Further, the receiving area, the weighing area and the setting-down area may be part of a conveyor belt capable of moving the second tray in the same direction and at the same speed as the support assembly.

Also, the moment when the weighing device measures the weight is chosen by said weighing device when the weigh detected is stable. Thus, there is no need of photoelectric cells.

The invention claimed is:

1. A conveyor system for transporting items from a receiving section to an outlet section, the conveyor system comprising:
a plurality of first support members for transporting the items;
a driving system along which the plurality of first support members are connected subsequently for transporting said plurality of first support members from the receiving section to the outlet section;
a guiding system for guiding at least the plurality of first support members; and
a weighing device for weighing the items at a weighing area;
characterized in that a second support member is arranged at a first support member by a means to form a support assembly, the means allowing the second support member for:
i) being supported by the first support member in a first vertical position; and
ii) being moved relative to the first support member between the first vertical position and a second vertical position higher than the first vertical position;
wherein the conveyor system comprises upstream relative to the weighing area a lifting device for moving the second support member from the first vertical position towards the second vertical position and wherein the weighing device is arranged for supporting the second support member at the weighing area when said second support member is in the second vertical position.

2. The conveyor system according to claim 1, wherein the means of the support assembly comprises a protrusion and an opening for hosting the protrusion.

3. The conveyor system according to claim 2, wherein the protrusion is arranged at the second support member and the opening is arranged at the first support member.

4. The conveyor system according to claim 3, wherein the protrusion extends from a top section downwardly in an inverted frustroconical shape, and the opening of the first support member comprises a circular section capable of adapting to the top section of the protrusion.

5. The conveyor system according to claim 1, wherein the second support member is supported on top of the first support member in the first vertical position.

6. The conveyor system according to claim 1, wherein the second support member comprises a support organ and the lifting device comprises a frame, the frame comprising a receiving area adjacent to the weighing area, said receiving area configured, when the support assembly is being moved by the driving system, for
i) receiving the support organ when the second support member is in the first vertical position and;
ii) guiding said support organ upward to the weighing area of the weighing device wherein the second support member is in the second vertical position.

7. The conveyor system according to claim 6, wherein the protrusion comprises the support organ.

8. The conveyor system according to claim 1, wherein the conveyor system comprises a setting-down device arranged downstream with respect to the weighing area, the setting-down device configured for moving the second support member relative to the first support member from the second vertical position to the first vertical position.

9. The conveyor system according to claim 8, wherein the setting-down device comprises a frame comprising a setting-down area adjacent to the weighing area, the setting-down area configured, when the second support member is being moved by the driving system, for
i) receiving the support organ of the second support member from the weighing area; and ii) guiding said support organ downward to get the second support member back in the first vertical position.

10. The conveyor system according to claim 1, wherein the weighing area is arranged at a conveyor belt, the conveyor belt being configured to move the second support member in the same direction and with the same speed as the support assembly.

11. The conveyor system according to claim 1, wherein the second support member is a tray member.

12. A method for processing items using a conveyor system, the method comprising the steps of
    transporting the items from a receiving section to an outlet section of the conveyor system;
    weighing the items; and
    processing the items according to the weight
    characterized in that the conveyor system is a conveyor system according to claim 1, and wherein weighing the items comprises the steps of
    moving the second support member of a support assembly relative to the first support member of said support assembly from a first vertical position to a second vertical position higher than the first vertical position by the lifting device; and
    weighing the second support member when said second support member is being supported on the weighing device in the second vertical position.

13. The method according to claim 12, wherein the method further comprises the step of moving the second support member relative to the first support member from the second vertical position to the first vertical position downstream the weighing area.

\* \* \* \* \*